United States Patent
Crosa et al.

(10) Patent No.: US 8,996,536 B2
(45) Date of Patent: Mar. 31, 2015

(54) FACET-BASED FILTERING OF SOCIAL NETWORK UPDATE DATA

(75) Inventors: Alejandro Crosa, Mountain View, CA (US); Esteban Kozak, Mountain View, CA (US); Yasuhiro Matsuda, Mountain View, CA (US); Xiaoyang Gu, Mountain View, CA (US); Hao Yan, Mountain View, CA (US); John Wang, Mountain View, CA (US); Chanh Nguyen, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 38 days.

(21) Appl. No.: 13/237,844

(22) Filed: Sep. 20, 2011

(65) Prior Publication Data
US 2012/0072432 A1     Mar. 22, 2012

Related U.S. Application Data

(60) Provisional application No. 61/384,657, filed on Sep. 20, 2010.

(51) Int. Cl.
G06F 17/30     (2006.01)

(52) U.S. Cl.
CPC .............................. G06F 17/30867 (2013.01)
USPC ........................................................ 707/748

(58) Field of Classification Search
None
See application file for complete search history.

(56) References Cited

U.S. PATENT DOCUMENTS

| | | | |
|---|---|---|---|
| 2007/0255807 A1* | 11/2007 | Hayashi et al. | 709/219 |
| 2009/0198566 A1* | 8/2009 | Greenberg | 705/10 |
| 2009/0204601 A1* | 8/2009 | Grasset | 707/5 |
| 2010/0135584 A1* | 6/2010 | Tang et al. | 382/218 |
| 2010/0177938 A1* | 7/2010 | Martinez et al. | 382/118 |

* cited by examiner

*Primary Examiner* — Bai D. Vu
(74) *Attorney, Agent, or Firm* — Schwegman Lundberg & Woessner, P.A.

(57) ABSTRACT

A network update interface is presented to a user on a network to display network updates from other users of a mutual social-networking site. The network updates shared by the other users are gathered in a stream and supplied to a facet-filtering system including a network update interface. The user controls the display of certain network update items according to facet-filter characteristics enabled in facet-filter selection panels in the network update interface. The facet-filter characteristics are used by a facet filter to select certain network updates for display to the user in the network update interface. Trending links to further articles with content corresponding to the facet-filter characteristics are displayed to the user according to greatest popularity among the other users. Links to the profiles of the users sharing the articles are also provided in the network update interface.

18 Claims, 13 Drawing Sheets

WHO SHARED THIS HEADLINE

HOW MUCH EVERYONE MAKES IN SPRINGFIELD

FOCUS MAGAZINE HAS COLLECTED THIS STUPENDOUS INFOGRAPHIC ASSEMBLY OF VARIOUS TECH POSITIONS IN SPRINGFIELD WITH CORRESPONDING SALARIES. NOTE THERE ARE FAR MORE TECH JOBS TODAY THAN AT THE PEAK OF THE DOTCOM BUBBLE.

RECENT SHARES OF THIS ARTICLE

PATTY WAINWRIGHT HERE'S HOW MUCH EVERYONE IS MAKING IN SPRINGFIELD VIA SOCIAL NET #1 HTTP://TECH_CO/8LGPJ/NY

PETER OWNENS HOW MUCH DOES EVERYONE MAKE IN SPRINGFIELD? HTTP://FLUIDITY_UI/87IONESPJ/HZP VIA @SAITK SOCIAL NET #1

PEGGY WINTHROP SPRINGFIELD VC'S THRONG TO HIGH-TECH HTTP://TECHNO_GLOBAL/MARKETS/BP @ MORAN EAGLE NET #1

WAYNE BILSKI GET PAID FOR FAIR VALUE IN SPRINGFIELD HTTP://T_CO/OAHBYYZ VIA BIRDTALK NET8

COMPANY
☐ LINKEDIN (85)
☐ HALSWORTH (62)
☐ AIMES CORP. (34)
☐ TORK_CO (8)
SEARCH COMPANIES

INDUSTRY

LOCATION
☐ SAN FRANCISCO BAY AREA (143)
☐ GREATER NEW YORK CITY AREA (33)
☐ BENGALURU AREA, INDIA (22)
☐ TOKYO, JAPAN AREA (15)
SEARCH LOCATIONS

FIG. 8

FACET-BASED FILTERING OF SOCIAL NETWORK UPDATE DATA

CROSS-REFERENCE TO RELATED PATENT DOCUMENTS

This patent application claims a priority benefit to—and is a continuation of Provisional Patent Application No. 61/384,657, entitled "FACET-BASED FILTERING OF PEOPLE NETWORK UPDATE DATA," filed on Sep. 20, 2010, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011, LinkedIn Corporation. All Rights Reserved.

TECHNICAL FIELD

This patent document pertains generally to data management systems, and more particularly, but not by way of limitation, to facet-based filtering of social network update data.

BACKGROUND

Many users of the Internet belong to one or perhaps several social-network services where numerous communications between users, friends, and acquaintances relay updates of users' activities, interests, and noteworthy websites they may wish to share with one another. When a user visits a website he finds of particular interest or that he thinks may be of interest to other members of his social network, he may desire a way to readily share the website or perhaps a particular article found there with other users. Given the hundreds of thousands of websites on the Internet and the millions of users, each of which may be acquainted with, or members of, several or even dozens of blogs and social networks, if shared, the amount of network updates amongst users would be overwhelming for any single user to navigate.

BRIEF DESCRIPTION OF DRAWINGS

Some embodiments are illustrated by way of example and not limitation in the figures of the accompanying drawings in which:

FIG. 8 is a diagrammatic representation of a shared link interface, according to some embodiments;

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Environment

During navigation of a network, such as the Internet, a user who is a member of a social-networking site may encounter a number of websites, news articles, and information sources that would be of interest to other members of the social-networking site. The user may determine that the content of a particular news article is appropriate for a certain audience of the social-networking site and may desire a convenient and easy way to share the article with the other members.

Figure 1:
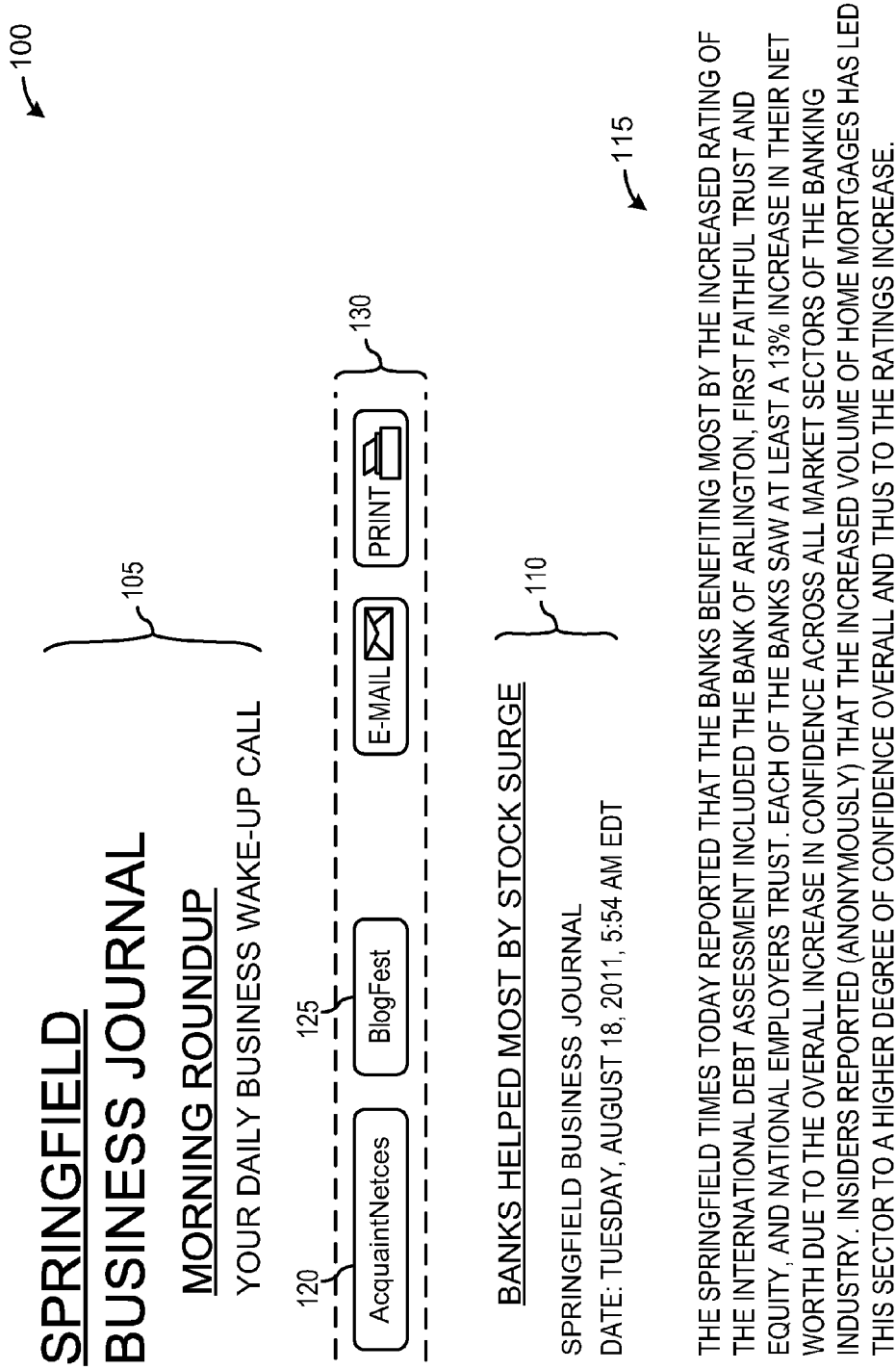
FIG. 1 is a diagrammatic illustration of an online network news article, according to some embodiments.

FIG. 1 is a diagrammatic illustration of an online network news article 100 as may appear on a network, such as the Internet, according to some embodiments. A periodical title and section heading may appear as a heading 105 in the upper portion of the display of the news article 100. In the lower portion of the news article display a headline 110 appears just above a news article 115. A toolbar 130 appears between the heading 105 in the headline 110. The toolbar 130 may include multiple user-selectable links to social network websites such as a AcquaintNetces share link 120 and a BlogFest share link 125 in a left portion of the toolbar 130. By selection of the AcquaintNetces share link 120 by the user, a link to the article may be transmitted as a "share" to the corresponding social-networking site, namely to (fictitious) AcquaintNetces.com. The additional user-selectable link, namely the BlogFest share link 125, may transmit a similar link as a further share of the article to a (fictitious) website BlogFest.net.

The user-selectable links to social network websites are but one mechanism that the user be used to share an article or a news story with members of social networking groups. For instance, the user wanting to share an article may send an e-mail, including information sufficient to link to the article, to a special e-mail address associated with a social network. Once received at the social network site, the e-mail information may be scanned for details and metadata relating to the article and a corresponding link may be created for sharing purposes. By way of additional example, the user may copy-and-paste information relating to the news story into a form provided by a corresponding social network site for creating a share of web related articles. Once the information and metadata relating to the news story are entered by the user into the form, the corresponding social network site may process the information into a share of the news story for the site's other users.

Figure 2:
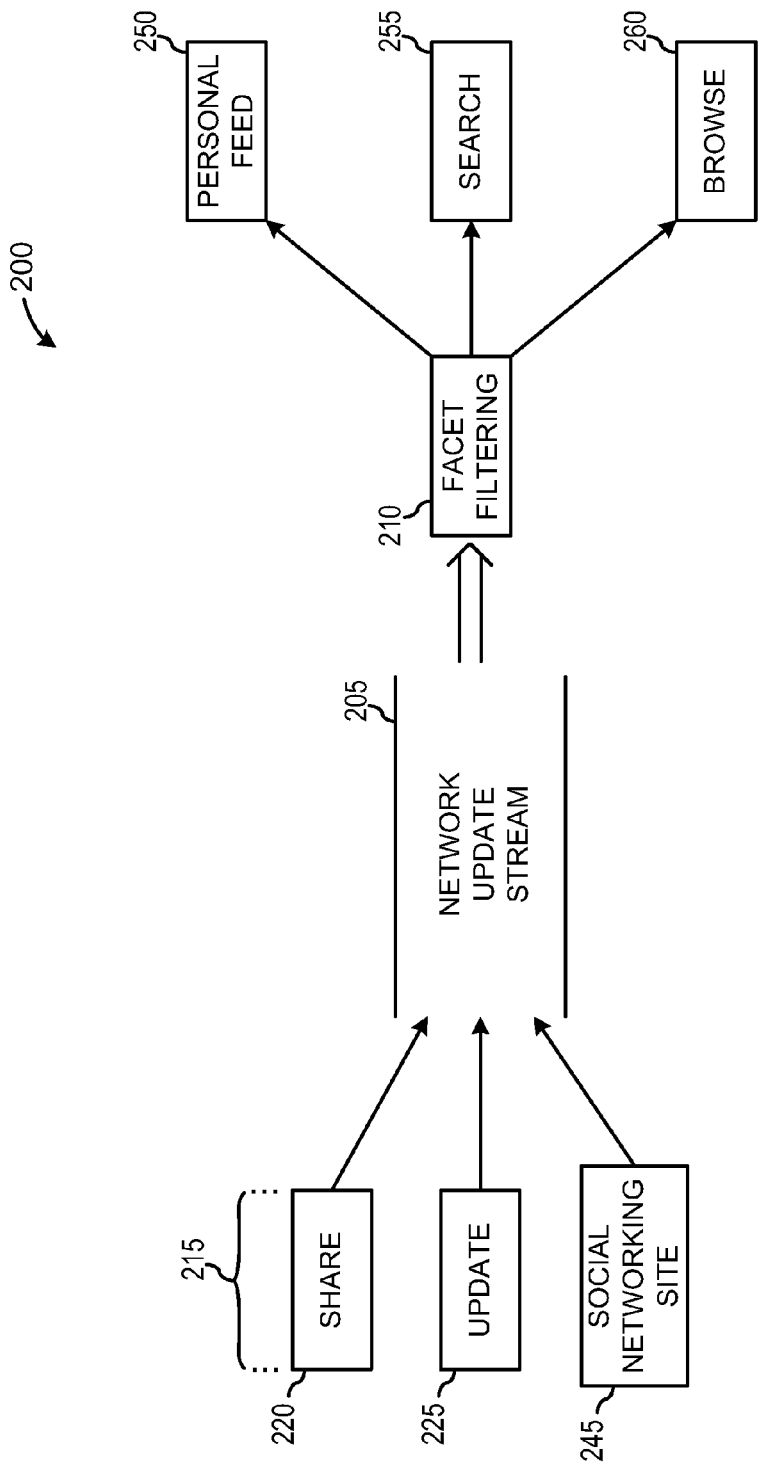
FIG. 2 is a block diagram illustrating an online network update system environment, according to some embodiments.

FIG. 2 is a block diagram illustrating a network update system environment 200 including a network update stream (NUS) 205 communicatively coupled to a facet-filtering module 210, according to some example embodiments. A number of network data sources 215 are communicatively coupled to an input of the NUS 205. The network data sources 215 may include a share source 220, an update source 225, and a social-networking site 245, for example. The network data sources 215 are communicatively coupled to a facet-filtering module 210 through the NUS 205. The facet-filtering module 210 is communicatively coupled to a personal feed module 250, a search module 255, and a browse module 260.

A news article such as the online network news article 100 may be shared (FIG. 1) and gathered by the share source 220 as a network update stream entry. The online network news article 100, taken as an example stream entry, may then be routed to the NUS 205 along with network update stream entries from the other network data sources 215. Each of the network data sources 215 may gather network update stream entries from the respective interest areas of users. Network update stream entries may include general updates from social-networking sites, activities engaged in by users, connections made between users, and occurrences at their companies that users may relate to. For example, network updates in the form of changes to the network news article 100, may be gathered by the update source 225 and routed as network update stream entries to the NUS 205.

The network update stream entries are routed through the NUS 205 to the facet-filtering module 210. According to filtering processes conducted by the facet-filtering module 210 and configured by the user, the online network news article 100 may be routed to any of the personal feed module 250, the search module 255, or the browse module 260 for presentation to the user. Each of the search module 255 and browse module 260 include a capability to follow certain types of articles targeted by filtering processes in the facet-filtering module 210 (explained below). It may be appreciated that by the time a network update stream entry has been filtered by the facet-filtering module and presented at any one of the personal feed module 250, the search module 255, or the browse module 260, the stream entry may be referred to as a network update item.

System

Figure 3:
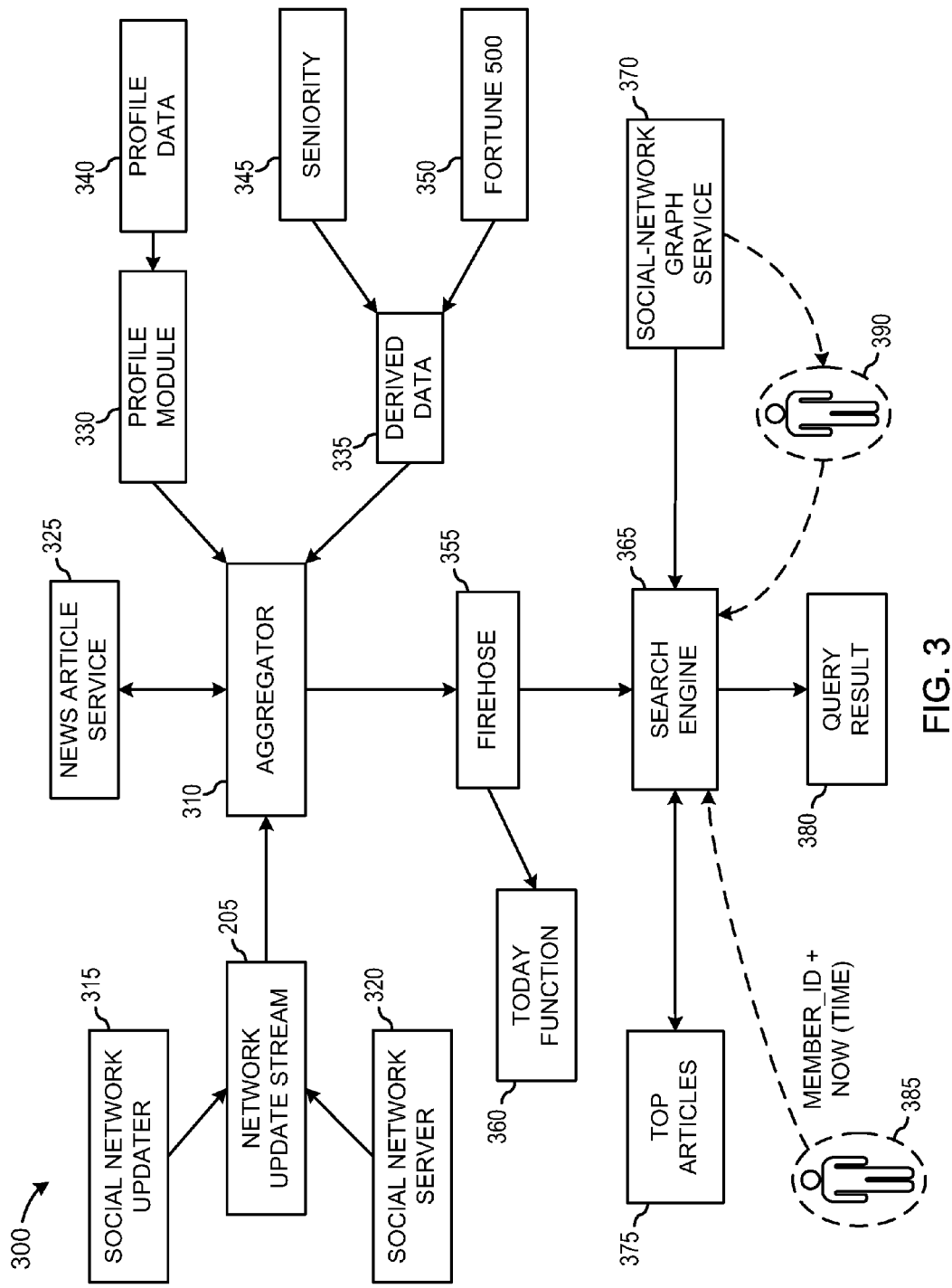
FIG. 3 is a block diagram illustrating a network update system, according to some embodiments.

FIG. 3 is a block diagram illustrating a network update system 300 that includes the NUS 205 (FIG. 2), which is communicatively coupled to an aggregator 310. The NUS 205 is communicatively coupled to a social network updater 315 and a social network server 320. The aggregator 310 is communicatively coupled to a news article service 325, a profile module 330, and a derived data module 335. The profile module 330 is communicatively coupled to profile data module 340. The derived data module 335 is communicatively coupled to a seniority module 345 and a Fortune 500 module 350. The aggregator 310 is also communicatively coupled to a firehose module 355, which in turn is communicatively coupled to a today function 360 and a search engine 365. The search engine 365 is communicatively coupled to a social-network graph service 370 and to a top articles module 375. The search engine is also communicatively coupled to a query result module 380. A first point of user interaction 385 includes a member ID and "NOW(time) function" which communicatively couples into the search engine 365. A second point of user interaction 390 is included between the social-network graph service 370 and the search engine 365.

In operation, the aggregator 310 receives network update stream entries from the NUS 205. The NUS 205 is provided updates and shares as network update stream entries from the social network updater 315 and the social network server 320. The social network updater 315 and the social network server 320 are particular forms of network data sources 215 (FIG. 2). A network update stream entry coming from the social network updater 315 may be a link to a news article such as the online network news article 100 (FIG. 1). The aggregator 310 may request an actual news article by providing the corresponding link provided in the network update stream entry to a news article service 325 and in response, receive the associated news article.

The aggregator 310 may also receive profile data from the profile data module 340 through the profile module 330. The profile data may correspond to the user who has submitted the network update item. The profile data may be related by the aggregator 310 to the network update item with the use of a corresponding index or with a relational tag. The profile data may be accessible by a viewing user through an associated link provided along with the network update item (further described below).

The derived data module 335 provides derived data to the aggregator 310 to be associated with network update stream entries. Derived data may not be directly supplied by the user but may be data that is determined from other information supplied by—or known about the user. Derived data may include data such as seniority information and corporate information for instance. The derived data module 335 may receive seniority information from the seniority module 345 in the form of years of experience, job commencement and end dates, and job title information. From the received seniority information the derived data module 335 may be able to determine the user's general management position, such as entry level, senior, owner, director, or a chief officer of a corporation. The derived data module 335 may in turn supply the seniority information to the aggregator 310 to be correlated to the update item in a process similar to that used for tagging and indexing the profile data (described above).

Corporate data such as information regarding Fortune 500 companies as well as other companies and corporations may be provided by the Fortune 500 module 350 to the derived data module 335. Companies and corporations that may have a correspondence to the submitting user and to the network update item may be determined by the user's profile information, such as job history, title, and location as well as by network associations (described below). The corporate data may be included with the derived data to the aggregator 310 to be correlated with the update item in a process similar to how seniority information may be correlated with the update item (described above).

Output of the aggregator 310 is directed to the firehose 355. The firehose 355 directs data to the today function 360 and the search engine 365. The firehose 355 operates to update the NUS 205 and produces richer documents through integration correlation of submissions from the aggregator 310. The today function 360 keeps track of the current time, the time of submission of network update stream entries, as well as the time stamps of articles and data items being linked to. The relative timing between submission of network update stream entries and submitted articles is used to sequence presentation of updates to the user in a meaningful chronological order.

The search engine 365 receives the network update stream entries as a continuous stream from the firehose 355. The search engine 365 interacts with the user through a network update interface (described below) and produces search results to the query result module 380. The search engine 365 receives social-network graph data indicating connections and relationships between users from the social-network graph service 370. The professional graph data determines the user's network where various degrees of separation between the user and other users is portrayed based on connections and associations amongst users. The user's network may also be used to provide certain filtering facets for filtering network update stream entries.

The search engine also interfaces with the top articles module 375 to acquire links to the articles of greatest popularity (e.g., which are most often being shared or recommended by users) and uses the acquired links and ranking information to provide a trending links presentation (described below) to the user. The search engine 365 may receive updates from members and identify who each member is. The search engine 365 may also query the text of articles, data sources, and users' input and produce corresponding selections of these items to be network update items based on facet-filter selections made by the user. The search engine 365 may also continuously listen to the social-network graph service 370 to make sure that the user's network information is always up to date so that the full extent and impact of associations and relationships may be utilized in filtering network update stream entries and producing search results. The search engine 365 is also responsible to deduce top articles and top updates as well as to make the update items available immediately and continuously to the user.

Figure 4:
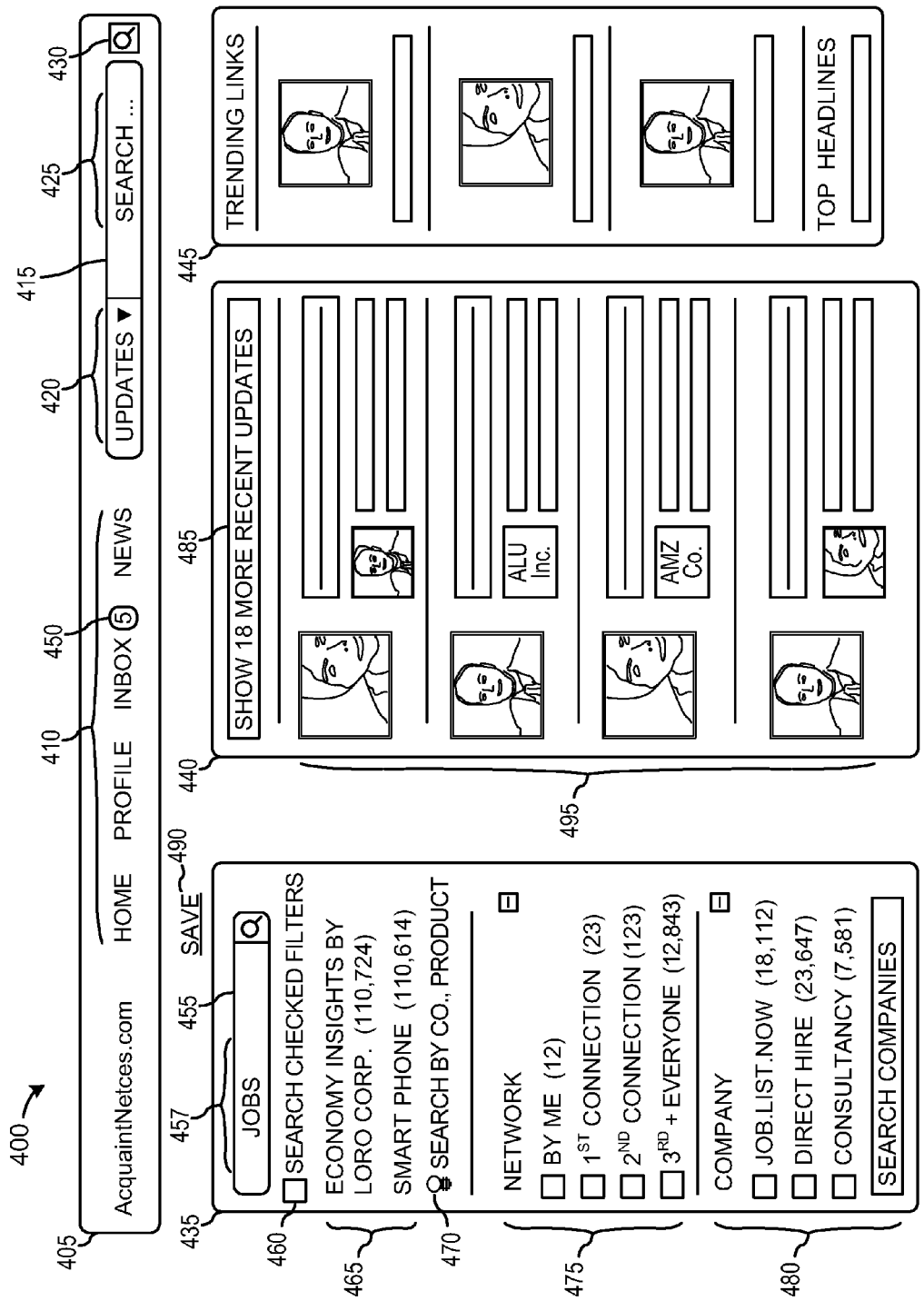
FIG. 4 is a diagrammatic representation of a network update interface, as may be used in some embodiments.

FIG. 4 is a diagrammatic representation of a network update interface 400 according to some embodiments. The network update interface 400 may be displayed at a social-networking site 245 on the Internet. A toolbar 405 may include selection tabs 410 and a first query input bar 415. The selection tabs 410 may include user-selectable links that when selected by the user, provide navigation to a home page, a profile pane, the user's inbox (e.g., showing five unopened communications 450), and a page of news, for example. Each of the selection tabs 410 may be configured to provide further user-selectable options (not shown) which may be presented when the user's cursor is hovered over a respective selection tab 410. For example, when the user's cursor is hovered over the profile tab of the selection tabs 410, further profile-related options may be presented in a pop-up menu. The further profile-related options may be user-selectable options to edit the user's profile, view the user's profile, set recommendations, and invoke a profile organizer, for example. Each of the other selection tabs 410 may have respective and corresponding user-selectable options to select configurations and choices related to the subject of the selection tab 410.

The first query input bar 415 may include an updates type field 420 ("UPDATES") with a pulldown menu (e.g., activated by an emboldened downward pointing arrowhead) and a first search field 425. A search button 430, located adjacent to the first query input bar 415, may activate a search according to text entered in the first search field 425. A search according to text entries made in the first search field 425 may also be initiated with a keyboard entry such as by pressing the enter key.

The network update interface 400 also includes a facet-filtering pane 435, a network updates pane 440, and a trending links pane 445. The facet-filtering pane 435 includes a second query input bar 455 and a second search field 457. An upper portion of the facet-filtering pane 435 includes a "search with checked filters" selector 460, a saved facet-filter selections field 465, and a preconfigured facet-filter selector 470. The facet-filtering pane 435 also includes a derived-data facet-filter selection panel 475 and a user-selectable facet-filter selection panel 480 (each described below). The network updates pane 440 includes a pending updates bar 485 and several network update items 495 (described below). The trending links pane 445 includes several news articles identified as popular trending links and a collection of top headlines (described below).

The user may enter search terms in the first search field 425 or the second search field 457 and activate a network updates search or query. The search terms entered by the user become facet-filter entries to be used by the search engine 365 in filtering network update stream entries. The fundamental types of network updates that will be searched may be determined by the updates type field 420. Possible update types selectable by the updates type field 420 and corresponding pulldown menu may be people, groups, updates, jobs, companies, answers, and inbox (not shown) for example. Further filter criterion may be introduced by selecting the "search with checked filters" selector 460 along with entry of the search terms in the first search field 425 or the second search field 457 and update types selected in the updates type field 420. Network update stream entries propagating through the NUS 205 may be filtered according to selections made by the user in the updates type field 420 and the facet-filter entries produced by search term entries made by the user.

The search results may be displayed in the network updates pane 440 as an array of network update items 495, including associated links to articles (described below). For example after selection of the companies update type in the updates type field 420 (not shown) and entry of the search term "Loro," network update stream entries having some correlation with the company "LORO CORP." may be filtered from the NUS 205 and displayed on the network updates pane 440 in the network update items 495. A user-selectable save button 490 may be used to save network update search terms entered in the first search field 425 as well as the second search field 457. The saved search terms are displayed after retention in the saved facet-filter selections field 465 as user-selectable links and may be selected by the user at a later time to initiate a further instance of the same search. For example, when the search term "Loro" is combined with "economy insights" in a search and the save button 490 is selected, the saved network update search term "ECONOMY INSIGHTS BY LORO CORP." may appear in the saved facet-filter selections field 465.

Later selection of saved search terms from the saved facet-filter selections field 465 may produce a new instance of the search using the saved search terms and may include search results extending back to previous search results as well as new and current network update items 495. Hovering the cursor the client device over an entry in the saved facet-filter selections field 465 may produce a greyed-out indication of a user-selectable deletion symbol (not shown). When selected by the user, the deletion symbol (e.g., a greyed-out "X" turning to a solid gray on selection) may trigger removal of the associated facet-filter selection from the saved facet-filter selections field 465. A preconfigured set of search terms may also be available to the user. Preconfigured search terms are retrievable for entry as a search condition by selection of the preconfigured facet-filter selector 470. Preconfigured search terms may be configured by editing the user's profile.

After the network update items 495 are displayed according to a first search, additional network update stream entries will continue to be filtered. The pending updates bar 485 provides an indication of the number recent updates that are pending and that comply with the facet-filter selections that are presently in effect. The pending updates bar 485 is also a user-selectable link that when selected provides an update of pending network update items 495 to the network updates pane 440. A further example of a manual update of pending network update items 495 may be the use of a keyboard shortcut such as the user's pressing the "Ctrl-R" keys to refresh the display. Yet a further update method may be to configure, according to a user's profile, and automatic update of the results according to a user-selected frequency. For example, a user may select an automatic update option to show more recent updates every two minutes.

The network update interface 400 may also display trending links (described below) in the trending links pane 445 at any time or during the course of presentation of network update items 495, for example. The trending links displayed are a result, in part, of a selection process influenced by facet-filtering options made by the user in the facet-filtering pane 435. Changes in the facet-filtering selections may change the trending links displayed. The trending links pane 445 may also display top news headlines which may be taken from the news article service 325 and selected by computations performed by the search engine 365. The top news headlines displayed in the trending links pane 445 may be determined by the search engine 365 based on correlations with selected facet-filtering options. Alternately, the trending links pane 445 may be replaced by a display of ads.

Figure 5:
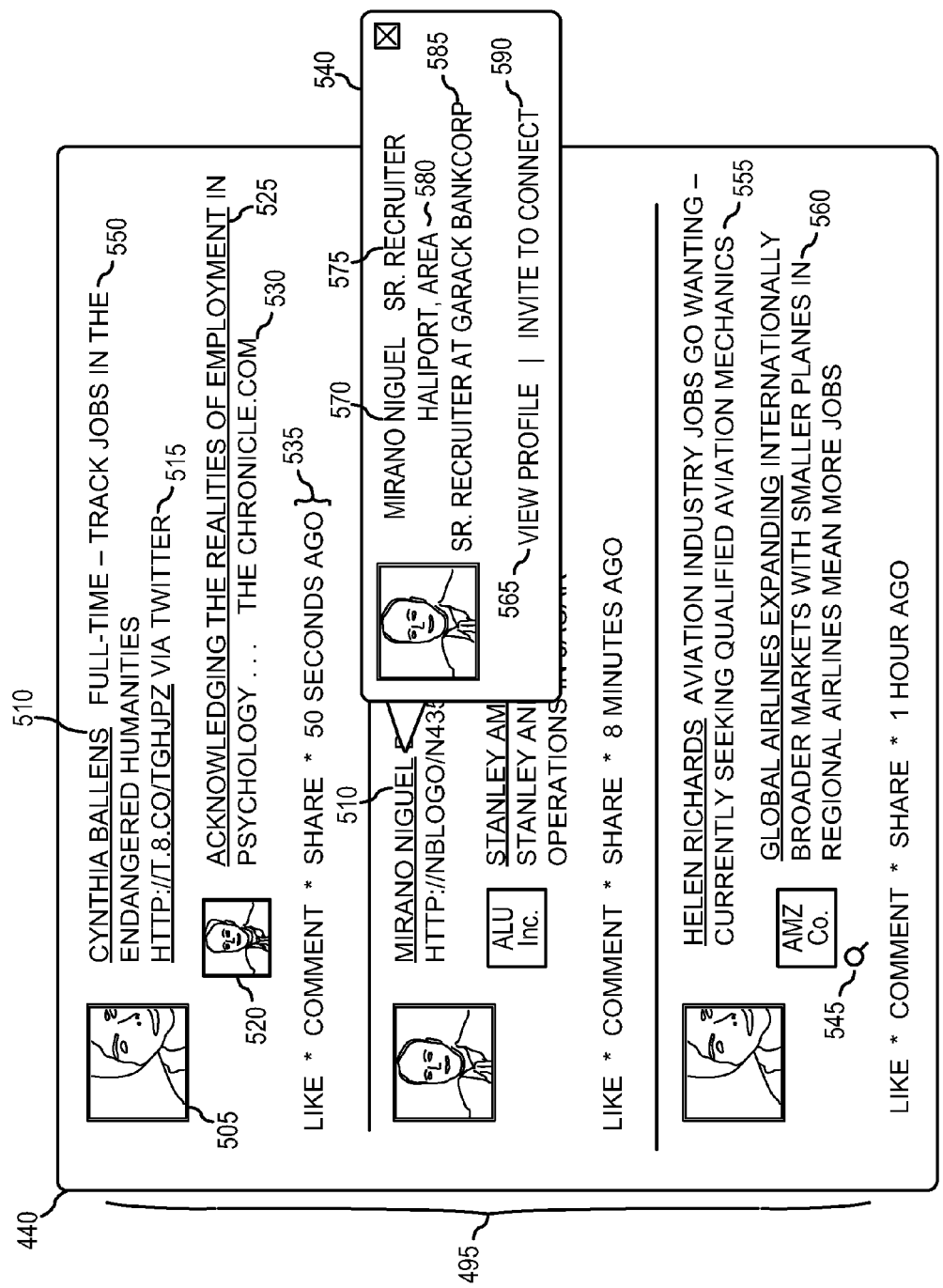
FIG. 5 is a diagrammatic representation of network update items, as may be used in some embodiments.

FIG. 5 is a diagrammatic representation of network update items 495, as may be used in some example embodiments of the network update interface 400 (FIG. 4). As discussed above, network update items 495 may be displayed in the network updates pane 440 of the network update interface 400. Each of the network update items 495 includes a user-selectable graphic representation 505 and a corresponding profile link 510 to the profile of the user submitting the network update stream entry. Each of the network update items 495 may also include any combination of a submitting-user comment 550, a headline 555, and a user-selectable article source link 515 to an article being shared by the submitting user.

Each of the network update items 495 may also include a snippet of the shared article including a user-selectable representative graphic 520, a user-selectable headline link 525, a portion of text from the shared article 560, and a shared article source 530. The display area for each of the network update items 495 may include a share bar 535 that in turn includes user-selectable links to "like" the shared article, "comment" on the shared article, or further "share" the shared article, for example. The share bar 535 may also include an indication of how long ago each of the respective network update items 495 was received as a network update stream entry by the network update interface 400 from the NUS 205.

The viewing user may select the shared article by selecting the representative graphic 520, the headline link 525, or alternately, by activating an inspection graphic 545 that may be displayed in the network updates pane 440. Once selected, the shared article (not shown) may be displayed in a network browser as a replacement for the presently displayed tab-window, a new pop-up window, a new tab-window, or in a new invocation of the browser (new browser window).

Direct access to the profile of the submitting user may be accomplished by selection of the graphic representation 505 or the corresponding profile link 510. As well as being directly selectable, the corresponding profile associated with each network update item 495 may be accessed by selecting a "View Profile" option 565 in a pop-up display of a short form of the submitting user's profile 540. The viewing user may hover the cursor of a respective client device (not shown) above the corresponding profile link 510 to activate the short form of the submitting user's profile 540. The short form submitting user's profile 540 may include the submitting user's name 570, position or title 575, location 580, and name of a company 585 or a corporation the submitting user works for. A user-selectable link to invite the submitting user to connect to the viewing user 590 within the respective social-networking service may also be presented in the short form submitting user's profile 540.

Figure 6:
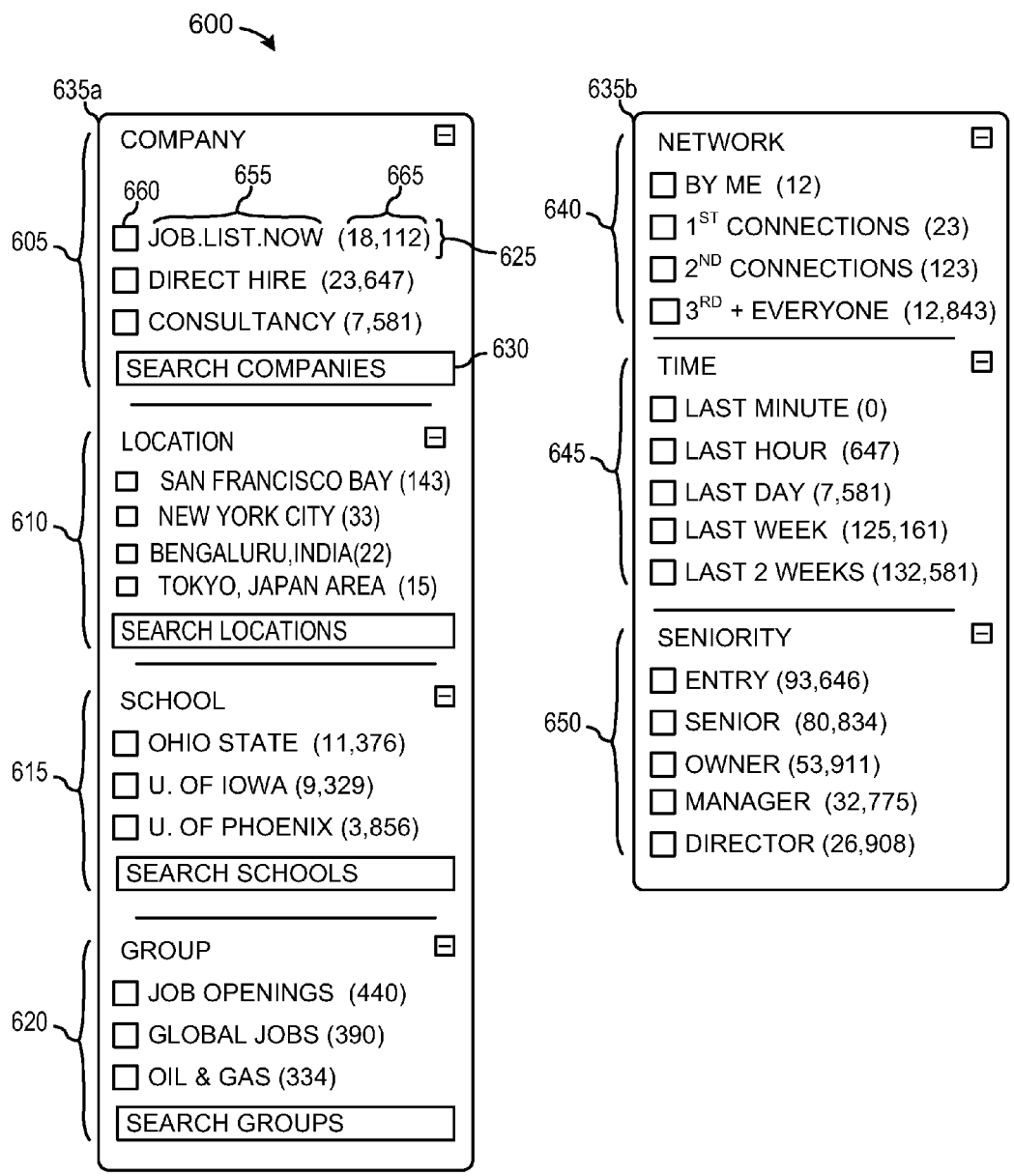
FIG. 6 is a diagrammatic representation of facet-filtering panels, according to some embodiments.

FIG. 6 is a diagrammatic representation of facet-filter selection panels 600, according to some example embodiments. Facet-filter selection panels 600 may typically be categorized as having facet-filter entry bars or as having preconfigured search selections. A first facet-filter pane 635a may include entry-bar facet-filter selection panels including a company selection panel 605, a location selection panel 610, a school selection panel 615, a group selection panel 620, and an industry selection panel (not shown), for example.

Regardless of type, both entry-bar facet-filter selection panels and preconfigured facet-filter selection panels include at least one facet-filter selection 625. Each facet-filter selection 625 includes a facet-filter name 655, a user-selectable checkbox 660, and an update item count 665. When enabled by selection of the corresponding checkbox 660, a facet-filter selection 625 is included as a filter criterion in the network update stream filtering process (see descriptions relating to the search engine 365 above). The update item count 665 may be a number appearing parenthetically in the facet-filter selection 625 (e.g., "(18,112)"). The update item count 665 indicates the number of network update items filtered by the facet-filter name 655 that may be available when the corresponding checkbox 660 is selected.

Each respective entry-bar facet-filter panel may have a search entry bar 630 in which text entries may be entered by the user as search terms for introducing new facet-filter selections (not shown). After entry of a new search term in the search entry bar 630 the new facet-filter selection may replace a previous facet-filter selection when a maximum number of facet-filter selections per facet-filter selection panel may be reached.

A second facet-filter pane 635b may include preconfigured search collections including a network selection panel 640, time selection panel 645, and seniority selection panel 650 as well as topic, update type, and category selection panels (not shown). In practice, a typical facet-filter pane may include any combination of entry-bar facet-filter selection panels and preconfigured facet-filter selection panels.

The typical facet-filter pane may also include additional selection tools or "view-by" tools (not shown) such as user-selectable tools to view updates by category, view updates by connection, and view the user's updates, for example. Each view-by selection may operate on all network update items retained over a user-configurable period of time or on network update items filtered by the present set of facet-filter settings. Once enabled, the view-by selection results may be presented within a separate browser tab or window (not shown) with view-by selection tabs available to perpetuate the availability of the "view-by" tools in the original facet-filter pane.

When more than one facet-filter selection 625 appears in the facet-filter pane 635a-b, the facet-filter selections 625 may be sorted according to the update item count 665 in ascending or descending numerical order according to which sorting sequence makes the most sense. For example, the network facet-filter panel 640 may be sorted in ascending numerical order (started from those closest in the user's network; i.e., smaller to larger numbers) and the location facet-filter panel 610 may be sorted in descending numerical order (nearby locations being of greater interest also tend to have a larger number of search connections). These respective numerical sortings allow a most relevant facet-filter selection 625 to be positioned first in the corresponding facet-filter pane 635*a*-*b*.

Figure 7:
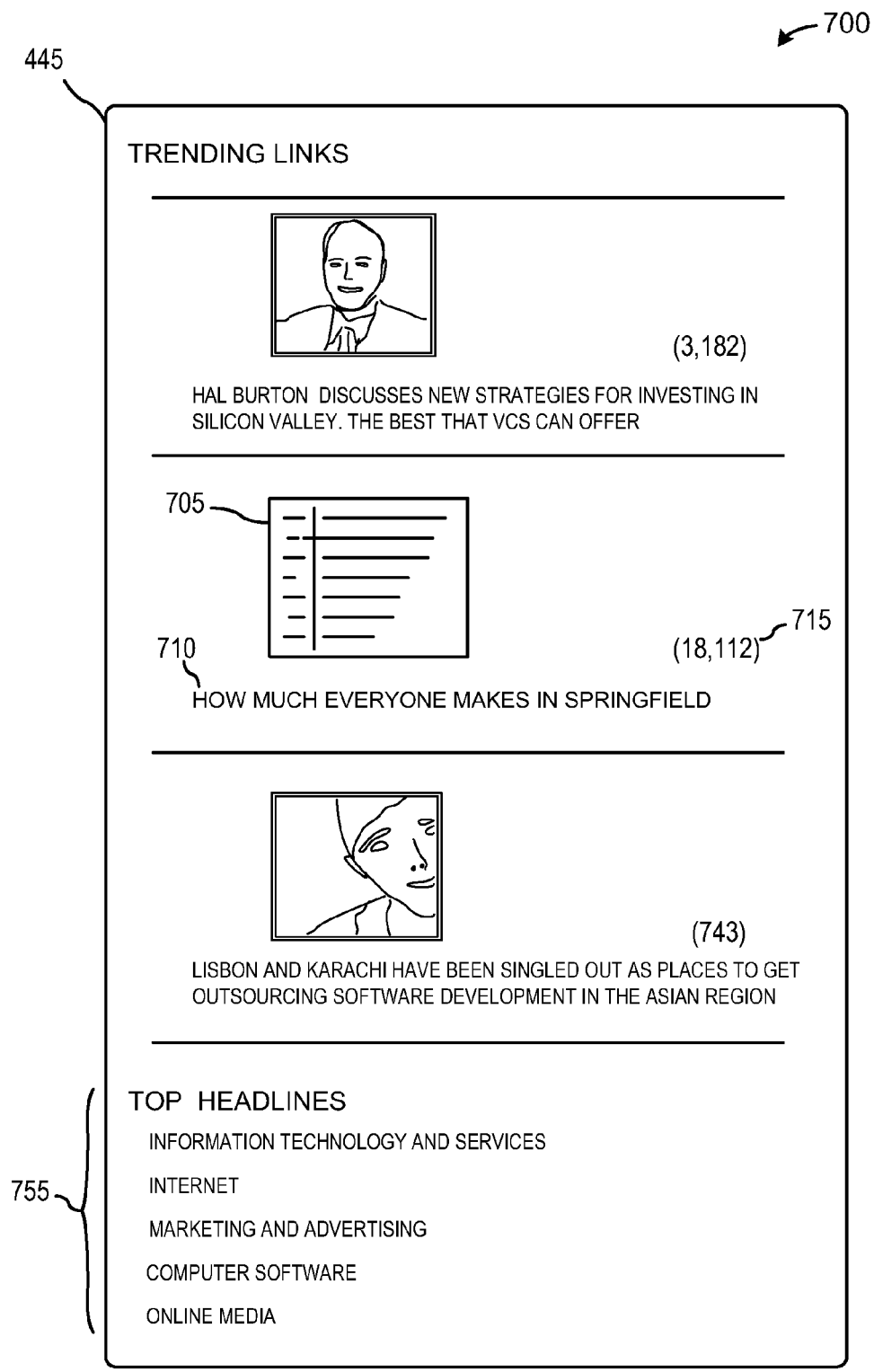
FIG. 7 is a diagrammatic representation of a trending links display, as may be used in some embodiments.

FIG. 7 is a diagrammatic representation of a trending links display 700, as may be used in some example embodiments. The trending links pane 445 (FIG. 4) may include several trending links, each with a trending article headline. Each trending article headline may include a user-selectable trending graphic 705, a user-selectable trending headline snippet 710, and a user-selectable sharing users indicator 715, each corresponding to a respective article headline. Selection of the trending graphic 705 or trending headline snippet 710 navigates to a presentation of the trending article. Once selected, the trending article presented (not shown) corresponds to the respective portrayals of the article indicated in the trending graphic 705 and the trending headline snippet 710. The trending article may be presented in a new tab or new pane within the network browser or within a new browser window. The trending headline snippet 710 may include a user-selectable trending source indicator (not shown) which may indicate the source of the article, such as an online newspaper or publishing source. The trending source indicator, when selected, may navigate to a new tab or new window displaying a source context of the article within the online representation of the newspaper or published source. Changes in the facet-filter selection may change trending links displayed.

Trending links displayed within the trending links pane 445 are associated with the present facet-filter selection. The sharing users indicator 715 provides an indication of the number of users sharing the corresponding article. When several trending links are displayed within the trending links pane 445, the trending link with the greatest number of sharing users is displayed first in an upper portion of the trending links pane 445 with successively less popular trending links being displayed in descending order beneath the first. Hovering the client device cursor over the sharing users indicator 715 produces a navigation cue such as "See who shared this headline." Selection of the sharing users indicator 715 may generate a shared link interface (described below) presenting further details about the users sharing a selected trending link.

The trending links pane 445 may also include a top headlines panel 755 presenting related top headline links to articles associated with the present set of facet-filter selections. These top headline links may be displayed in the trending links pane 445 as user-selectable categories. Headline link categories such as information technology and services, Internet, financial services, and online media, may correspond, for example, to a set of facet-filtering settings used in a high-tech search (not shown). Selection of one of the top headline links may cause a browser to navigate to a new tab or window displaying an array of network news articles (not shown) associated with the top headline and corresponding category. Changes in facet-filter selection may change the top headline links displayed.

FIG. 8 is a diagrammatic representation of a shared-link interface 800, according to some example embodiments. An upper portion of the shared-link interface 800 may include the user-selectable trending graphic 705 and the user-selectable trending headline snippet 710 (FIG. 7) corresponding to the trending links pane 445. An article snippet 805 may also be included along with the user-selectable trending graphic 705 and the user-selectable trending headline snippet 710 in the upper portion of the shared-link interface 800. As with the trending links pane 445, selection of the trending graphic 705 or the trending headline snippet 710 may present a new browser tab or new browser window within which the trending article may be displayed (not shown).

In a lower portion of the shared-link interface 800, an array of recent shares 810 of this article may be included. Each of the recent shares 810 may include the graphic representation 505 and corresponding profile link 510 (FIG. 5) of the user submitting the shared article (as a network update stream entry originally). A user-selectable article source link 515 to the shared article may also be included. As with the network update interface 400 of network update items 495, direct access to the profile of the submitting user may be accomplished by selection of the graphic representation 505 or the corresponding profile link 510 of the submitting user. Selection of the article source link 515 navigates the viewing user to the article being shared by the submitting user.

A facet-filter pane similar to the first facet-filter pane 635*a*, may include entry-bar facet-filter selection panels (FIG. 6) and be included in the lower portion of the shared-link interface 800 to filter the recent shares 810. In a fashion similar to that described in relation to the facet-filter selection panels 600, the company selection panel 605 with facet-filter selections 625 may be used as a filter criterion to filter the recent shares 810 in the shared-link interface 800. For example, when enabled by selection of the corresponding checkbox 660, the facet-filter selection 625 is included as a facet-filter component to tailor display of recent shares 810. A recent share 810 displayed after filtering according to the facet-filter selection 625 may include a corresponding company component. Enabling multiple facet-filter selections 625 limits the number of recent shares 810 correspondingly. The search entry bar 630 may be used by the user to enter search terms for introducing new facet-filter selections to filter the recent shares 810 selected for viewing. Several facet-filter selection panels 600 (e.g., "Industry" and "Location") may be added to include further aspects of facet-filtering of the recent shares 810.

Figure 9:
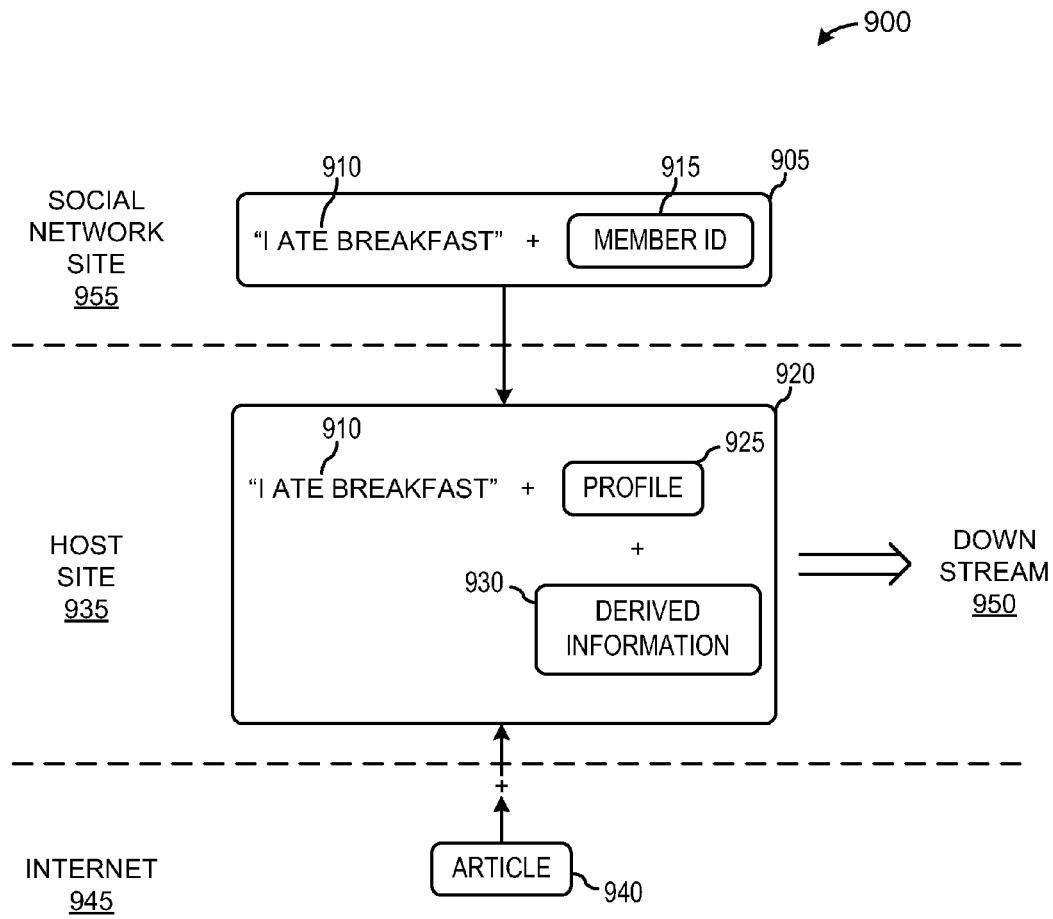
FIG. 9 is a diagrammatic representation of a network update stream entry, as may be used in some embodiments.

FIG. 9 is a diagrammatic representation of a network update stream entry 900, as may be used in some example embodiments. As described above in regard to FIG. 2, a network update stream entry may be received by one of the network data sources 215 and routed to the NUS 205. The network update stream entry 905 may be a "share" from a social network site 955, such as Twitter® feed, and may include a message ("I ate breakfast") 910 along with a Member_ID 915 corresponding to the user entering the message 910. The network update system 300 may process the network update stream entry 905 to produce a network update item 920 at a host site 935, such as AcquaintNetces. The host site 935 may include an the network update item 920, profile data 925 and derived information 930 associated with the submitting user. The profile data 925 corresponds to the profile data provided from the profile data module 340 through the profile module 330 (FIG. 3). The derived information 930 corresponds to the derived data provided by the derived data module 335.

An article 940 (e.g., the online network news article 100 [FIG. 1]) may be acquired by the network update system 300 from the Internet 945 and provided to the network update item 920 as a corresponding link which may be available to any facet-filtering process downstream 950 in the process of—or as a further extension of the network update stream process 900. An internal ID (not shown) may be assigned to the article 940 to provide later access by further users according to additional facet-filtering processes which may occur downstream 950.

Methods

Figure 10:
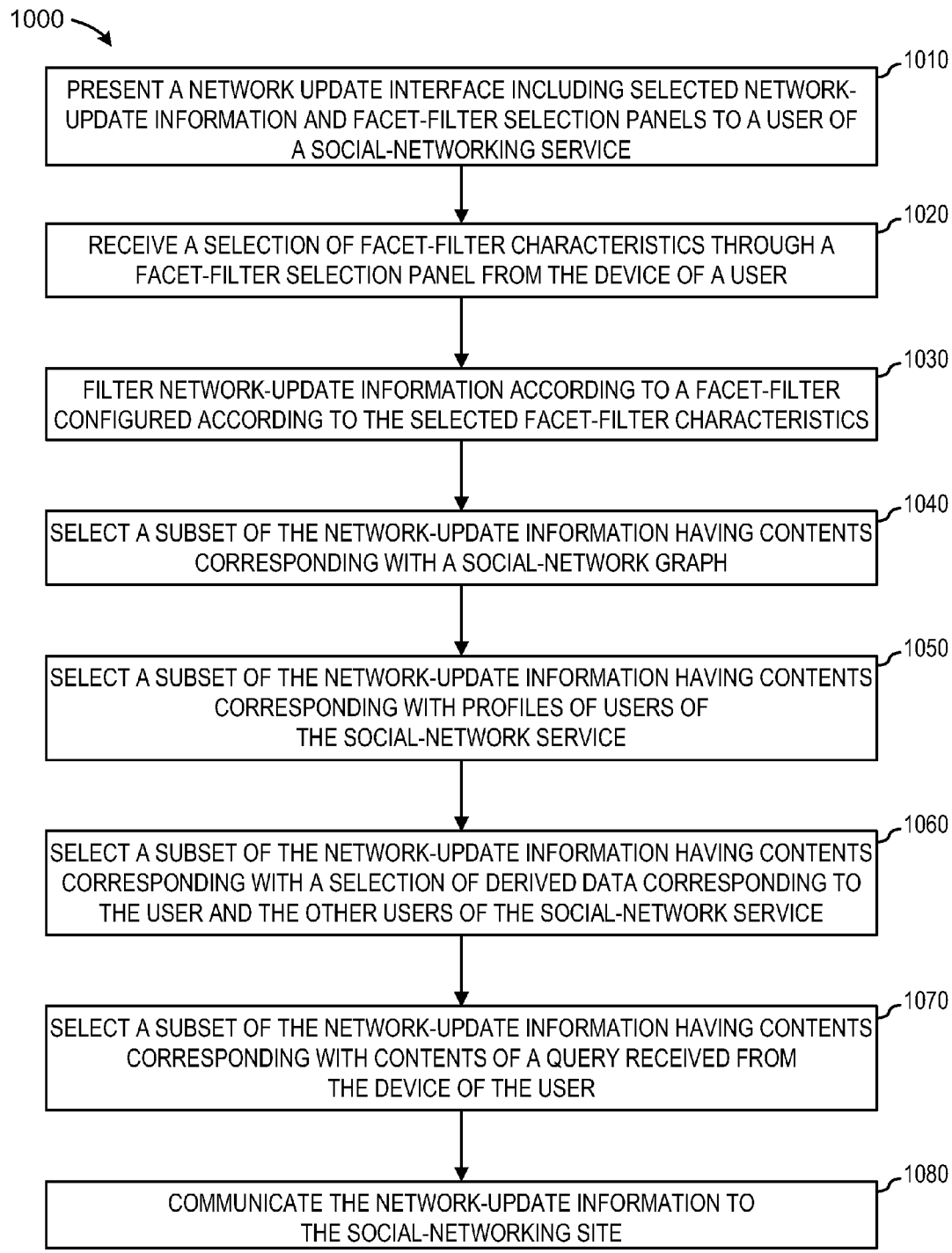
FIG. 10 is a flow chart illustrating a method of interfacing to a network update system, according to some example embodiments.

FIG. 10 is a flow chart illustrating a method of interfacing a network update system at a social-networking site 1000, according to some example embodiments. The method includes presenting 1010 a network update interface including selected network-update information and facet-filter selection panels 600 at a social-networking site 245. The network update interface may be accessed by a user of a social-networking service from the user's client device. The method continues with receiving 1020 a selection of facet-filter characteristics through the facet-filter selection panels 600 enabled from the device of the user. The method goes on with filtering 1030 network-update information generated by other users of the social-networking service with a facet-filter configured according to the selected facet-filter characteristics. Accordingly, the network update interface produces facet-filtered network-update information.

The method goes on with selecting 1040 a subset of the network-update information having contents corresponding with a social-network graph. The social-network graph may include relationships of the other users of the social-networking service with the user based on relative levels of association. A method continues with selecting 1050 a subset of the network-update information having contents corresponding with profiles corresponding to the user and the other users of the social-networking service. The profiles may include, for example, a user's name, a location, an industry, a company, and a school. The method also includes selecting 1060 a subset of the network-update information having contents corresponding to certain derived data obtained by deducing relationships and inferences among profile information corresponding to the user and the other users of the social-networking service. The derived data may include years of experience, job title, management position, and a seniority function which determines the relative seniority of the user according to titles and years of experience.

The method continues with selecting 1070 a subset of the network-update information having contents corresponding to contents of a query received from the device of the user. The query may be a text-based submission entered at a query input bar 630 provided in the network update interface. The method goes on with communicating 1080 the facet-filtered network-update information to the social-networking site 245 to update the presentation of selected network-update information to the device of the user.

Figure 11:
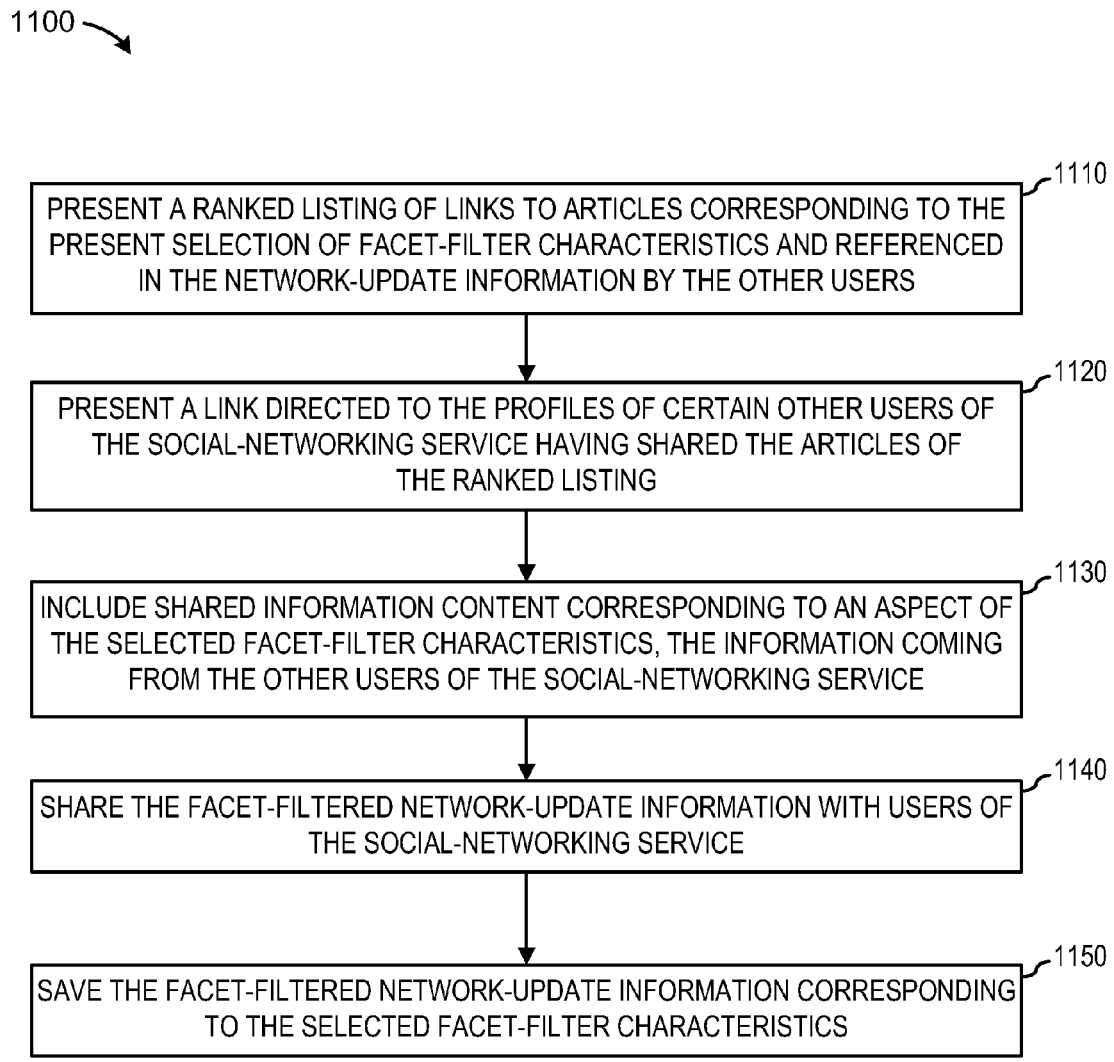
FIG. 11 is a flow chart illustrating a method of presenting a ranked listing of article links, according to some embodiments.

FIG. 11 is a flow chart illustrating a method of presenting a ranked listing of article links 1100. The method begins with presenting 1110 a ranked listing of links to articles referenced in the network-update information content by other users. The ranking may be displayed at the social-networking site 245 and based on an increasing trend in popularity with a large number of the other users and an interest indicated by renowned users of the social-networking service. The display of trending articles correspondence to the present selection of the facet-filter characteristics. The method continues with presenting 1120 a link directed to the profiles of certain other users of the social-networking service who may have shared the respective articles of the ranked listing display.

The method proceeds with including 1130 shared information content generated by one of the other users of the social-networking service and corresponding to the selected facet-filter characteristics. The shared information may include a commentary, a link to member information, an activity, a link to an article being shared, and a snippet of the shared article. The method includes sharing 1140 the facet-filtered network-update information with the other users of the social-networking service and saving 1150 the facet-filtered network-update information corresponding to the selected facet-filter characteristics.

Figure 12:
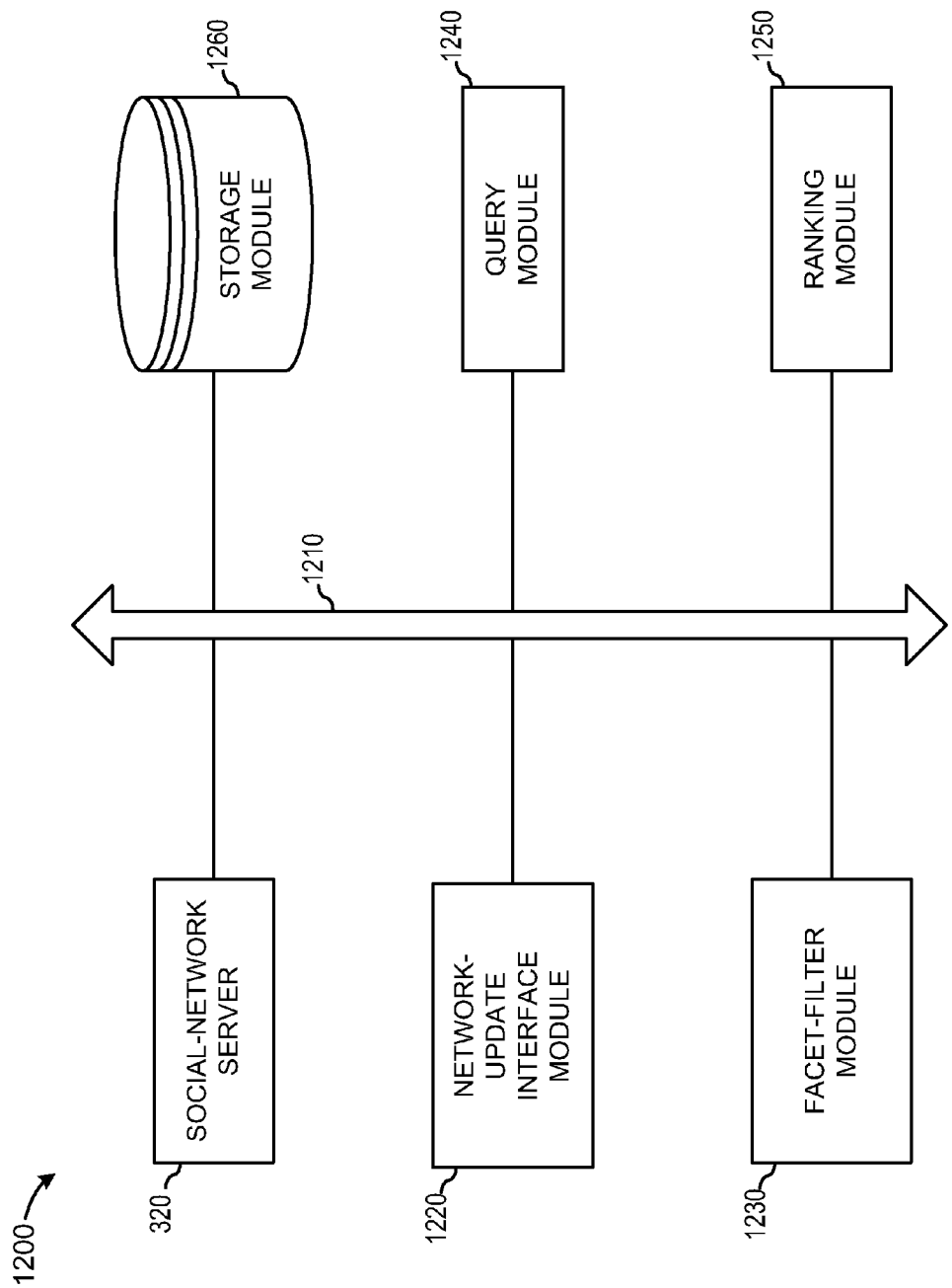
FIG. 12 is a block diagram illustrating a facet-based filtering system, according to some embodiments.

FIG. 12 is a block diagram illustrating a facet-based filtering system 1200, according to some embodiments. The facet-based filtering system 1200 includes the social-network server 320 (FIG. 3) communicatively coupled to a bus 1210. The social-network server 320 provides an online social-service to users over the Internet and is communicatively coupled to the Internet through the bus 1210. A network-update interface module 1220 is communicatively coupled to the bus 1210 and is configured to present the network update interface 400 (FIG. 4) to the user including network update information corresponding to the user's interaction with the facet-filter selection panels 600 (FIG. 6).

A facet-filter module 1230 filters network update stream entries according to the user's inputs with the facet-filter selection panels 600. The user may enter search terms in the first search field 425 or the second search field 457 that are fed to a query module 1240 to activate the network updates search. When several trending links corresponding to articles are displayed within the trending links pane 445, a ranking module 1250 is invoked to determine the trending link with the greatest number of sharing users, which when determined is displayed first in an upper portion of the trending links pane 445. After sharing the network-update information with other users the facet-filtered network-update information corresponding to the selected facet-filter characteristics may be stored in a storage module 1260 for later retention in further user searches.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture

Figure 13:
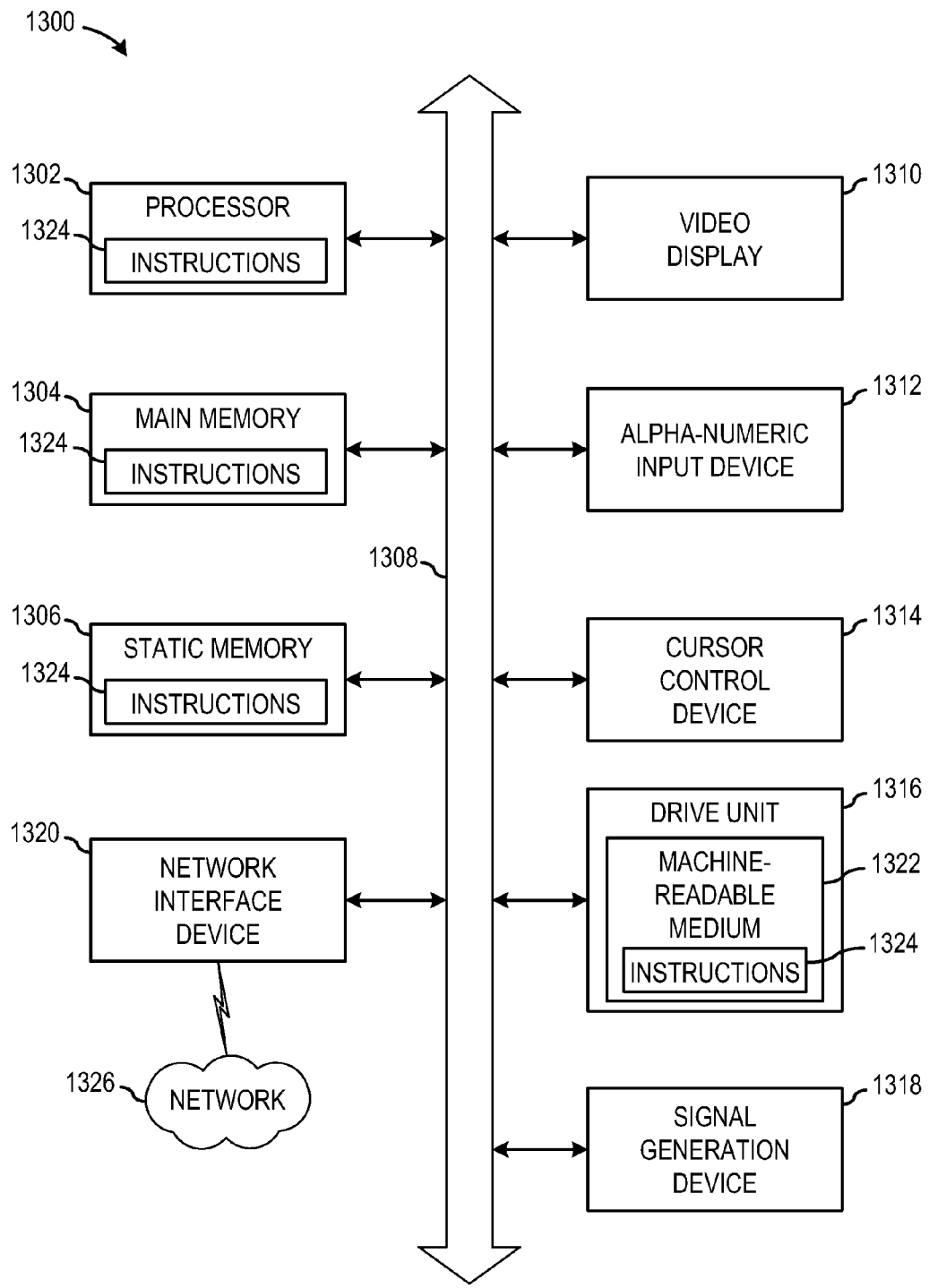
FIG. 13 is a block diagram of a machine in the example form of a computer system within which a set instructions, for causing the machine to perform any one or more of the methodologies discussed herein, may be executed.

FIG. 13 is a block diagram of machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a computer-readable storage medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constitute a computer-readable storage media.

While the computer-readable storage medium 1322 is shown in an example embodiment to be a single medium, the term "computer-readable storage medium" may include a single medium or multiple media (e.g., a centralized or distributed database, and/or associated caches and servers) that store the one or more instructions or data structures. The term "computer-readable storage medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "computer-readable storage medium" shall accordingly be taken to include, but not be limited to, solid-state memories, and optical and magnetic media. Specific examples of computer-readable storage media include nonvolatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 324 may further be transmitted or received over a communications network 326 using a transmission medium. The instructions 324 may be transmitted using the network interface device 320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
   at a social-networking site, presenting a network update interface including a presentation of selected network-update information and a plurality of facet-filter selection panels, the network update interface configured to be accessed by a user of a social-networking service;
   to the plurality of facet-filter selection panels, transmitting facet-filter indicators including relationship characteristics having existing social-networking relationship characteristics indicating connections and associations between at least one further user of the social-networking service and the user;
   receiving a selection of facet-filter characteristics including at least a portion of the relationship characteristics and the existing social-networking relationship characteristics through at least one of the plurality of facet-filter selection panels from a device of the user;
   filtering network-update information generated by further users of the social-networking service with a facet-filter configured according to the selected facet-filter characteristics to produce facet-filtered network-update information;

communicating the facet-filtered network-update information to the social-networking site to update the presentation of selected network-update information; and presenting, at the social-networking site, a ranked listing of links to articles referenced in the network-update information content by the further users, the ranking being based on an increasing trend, for a respective article, in at least one of popularity with a large number of the further users and an interest indicated by renowned users of the social-networking service, the respective article corresponding to the present selection of the facet-filter characteristics.

2. The method of claim 1, wherein filtering network-update information includes selecting a subset of the network-update information having contents corresponding with a social-network graph, the social-network graph including relationships of the further users of the social-networking service to the user based on relative levels of association with the user.

3. The method of claim 1, wherein filtering network-update information includes selecting a subset of the network-update information having contents corresponding with at least a portion of a plurality of profiles, the plurality of profiles corresponding to the user and the further users of the social-networking service and each profile including at least one of a user's name, a location, an industry, a company, and a school.

4. The method of claim 1, wherein filtering network-update information includes selecting a subset of the network-update information having contents corresponding to a selection of derived data, the derived data being obtained by deducing relationships and inferences among profile information corresponding to the user and the further users of the social-networking service.

5. The method of claim 4, wherein the derived data includes years of experience, job title, management position, and a seniority function.

6. The method of claim 1, wherein filtering network-update information includes selecting a subset of the network-update information having contents corresponding to contents of a query received from the device of the user, the query being a text-based entry inputted at a query input bar provided in the network update interface.

7. The method of claim 1, wherein presenting the ranked listing of links to articles further includes presenting a link directed to the profiles of the particular further users of the social-networking service having shared the respective articles of the ranked listing.

8. The method of claim 1, wherein the facet-filtered network-update information includes shared information content generated by one of the further users of the social-networking service, the shared information content corresponding to at least one particular aspect of the selected facet-filter characteristics and including at least one of a commentary, a link to member information, an activity, a link to an article being shared, and a snippet of the shared article.

9. The method of claim 1, further comprising:

sharing the facet-filtered network-update information with the further users of the social-networking service; and saving the facet-filtered network-update information corresponding to the selected facet-filter characteristics.

10. A computer-readable storage medium embodying a set of instructions, that when executed by at least one processor, causes the at least one processor to perform operations comprising:

at a social-networking site, presenting a network update interface including a presentation of selected network-update information and a plurality of facet-filter selection panels, the network update interface configured to be accessed by a user of a social-networking service;

to the plurality of facet-filter selection panels, transmitting facet-filter indicators including relationship characteristics having existing social-networking relationship characteristics indicating connections and associations between at least one further user of the social-networking service and the user;

receiving a selection of facet-filter characteristics including at least a portion of the relationship characteristics and the existing social-networking relationship characteristics through at least one of the plurality of facet-filter selection panels from a device of the user;

filtering network-update information generated by further users of the social-networking service with a facet-filter configured according to the selected facet-filter characteristics to produce facet-filtered network-update information;

communicating the facet-filtered network-update information to the social-networking site to update the presentation of selected network-update information; and presenting, at the social-networking site, a ranked listing of links to articles referenced in the network-update information content by the further users, the ranking being based on an increasing trend, for a respective article, in at least one of popularity with a large number of the further users and an interest indicated by renowned users of the social-networking service, the respective article corresponding to the present selection of the facet-filter characteristics.

11. The computer-readable storage medium of claim 10, wherein filtering network-update information includes selecting a subset of the network-update information having contents corresponding with a social-network graph, the social-network graph including relationships of the further users of the social-networking service to the user based on relative levels of association with the user.

12. The computer-readable storage medium of claim 10, wherein filtering network-update information includes selecting a subset of the network-update information having contents corresponding with at least a portion of a plurality of profiles, the plurality of profiles corresponding to the user and the further users of the social-networking service and each profile including at least one of a user's name, a location, an industry, a company, and a school.

13. The computer-readable storage medium of claim 10, wherein filtering network-update information includes selecting a subset of the network-update information having contents corresponding to a selection of derived data, the derived data being obtained by deducing relationships and inferences among profile information corresponding to the user and the further users of the social-networking service.

14. The computer-readable storage medium of claim 13, wherein the derived data includes years of experience, job title, management position, and a seniority function.

15. The computer-readable storage medium of claim 10, wherein filtering network-update information includes selecting a subset of the network-update information having contents corresponding to contents of a query received from the device of the user, the query being a text-based entry inputted at a query input bar provided in the network update interface.

16. The computer-readable storage medium of claim 10, wherein presenting the ranked listing of links to articles further includes presenting a link directed to the profiles of the particular further users of the social-networking service having shared the respective articles of the ranked listing.

17. The computer-readable storage medium of claim 10, wherein the facet-filtered network-update information includes shared information content generated by one of the further users of the social-networking service, the shared information content corresponding to at least one particular aspect of the selected facet-filter characteristics and including at least one of a commentary, a link to member information, an activity, a link to an article being shared, and a snippet of the shared article.

18. A system comprising:
   a social-networking server configured to generate a social-networking website;
   a network-update interface module configured to present selected network-update information and a plurality of facet-filter selection panels, the network update interface module further configured to receive a selection of facet-filter characteristics from a device of a user of a social-networking service;
   a facet-filter module communicatively coupled to network-update information generated by at least one further user of the social-networking service and configured to select a subset of the network-update information having contents corresponding to the facet-filter characteristics;
   a query module configured to receive a text-based entry through a query input bar generated by the network update interface module and to generate a further facet-filter characteristic to be communicated to the facet-filter module to cause a selection of a further subset of network-update information having contents corresponding to the text-based entry;
   a search engine configured to receive relationship characteristics having existing social-networking relationship characteristics indicating connections between the at least one further user to the user based on relative levels of association with the user according to a social-network graph and provide search results and a trending links presentation based on acquired links and a ranked listing of links;
   a ranking module configured to produce the ranked listing of links to articles referenced in the network-update information content by the further users based on an increasing trend, for a respective article, in at least one of popularity with a large number of the further users and an interest indicated by renowned users of the social-networking service; and
   a storage module configured to store a plurality of facet-filter characteristics.

* * * * *